(12) United States Patent
Ciesla et al.

(10) Patent No.: US 8,199,124 B2
(45) Date of Patent: *Jun. 12, 2012

(54) USER INTERFACE SYSTEM

(75) Inventors: Craig Michael Ciesla, Mountain View, CA (US); Micah B. Yairi, Palo Alto, CA (US)

(73) Assignee: Tactus Technology, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/652,708

(22) Filed: Jan. 5, 2010

(65) Prior Publication Data

US 2010/0171720 A1 Jul. 8, 2010

Related U.S. Application Data

(63) Continuation-in-part of application No. 12/319,334, filed on Jan. 5, 2009.

(60) Provisional application No. 61/223,002, filed on Jul. 3, 2009.

(51) Int. Cl.
*G06F 3/041* (2006.01)
*G08B 6/00* (2006.01)
*G09B 21/00* (2006.01)

(52) U.S. Cl. ............... 345/173; 178/18.01; 434/114; 340/407.02

(58) Field of Classification Search .......... 345/173–179, 345/168–169, 104, 172; 463/37–38; 455/466; 178/18.01–20.02; 434/112–117; 340/407.1–407.2
See application file for complete search history.

(56) References Cited

U.S. PATENT DOCUMENTS

| 3,034,628 | A |   | 5/1962  | Wadey                   |
|-----------|---|---|---------|-------------------------|
| 3,659,354 | A | * | 5/1972  | Sutherland ...... 434/113 |
| 3,818,487 | A | * | 6/1974  | Brody et al. ...... 340/407.1 |
| 4,109,118 | A |   | 8/1978  | Kley                    |
| 4,209,819 | A |   | 6/1980  | Seignemartin            |
| 4,307,268 | A |   | 12/1981 | Harper                  |
| 4,467,321 | A | * | 8/1984  | Volnak ............ 341/23 |
| 4,477,700 | A |   | 10/1984 | Balash et al.           |
| 4,517,421 | A |   | 5/1985  | Margolin                |

(Continued)

FOREIGN PATENT DOCUMENTS

WO 2008037275 A1 4/2008

OTHER PUBLICATIONS

Optical Society of America, Optics Express; vol. 12, No. 11. May 31, 2004, 7 Pages, Jeong, Ki-Hun, et al. "Tunable Microdoublet Lens Array".

(Continued)

*Primary Examiner* — Bipin Shalwala
*Assistant Examiner* — Jonathan King
(74) *Attorney, Agent, or Firm* — Jeffrey Schox

(57) ABSTRACT

A user interface system of one embodiment includes a layer defining a surface; a substrate supporting the layer and at least partially defining a cavity; a displacement coupled to the cavity that expands the cavity, thereby deforming a particular region of the surface; and a touch sensor coupled to the substrate and adapted to sense a user touch proximate the particular region of the surface. The layer and the substrate are connected at an attachment point, and the location of the attachment point relative to the layer, substrate, and cavity at least partially defines the shape of the deformed particular region of the surface.

28 Claims, 11 Drawing Sheets

U.S. PATENT DOCUMENTS

| | | | |
|---|---|---|---|
| 4,543,000 A | 9/1985 | Hasenbalg | |
| 4,920,343 A * | 4/1990 | Schwartz | 341/33 |
| 5,194,852 A | 3/1993 | More et al. | |
| 5,195,659 A * | 3/1993 | Eiskant | 222/102 |
| 5,222,895 A * | 6/1993 | Fricke | 434/113 |
| 5,286,199 A * | 2/1994 | Kipke | 434/114 |
| 5,369,228 A * | 11/1994 | Faust | 178/18.05 |
| 5,412,189 A | 5/1995 | Cragun | |
| 5,488,204 A | 1/1996 | Mead et al. | |
| 5,496,174 A * | 3/1996 | Garner | 434/114 |
| 5,742,241 A | 4/1998 | Crowley et al. | |
| 5,754,023 A | 5/1998 | Roston et al. | |
| 5,766,013 A * | 6/1998 | Vuyk | 434/114 |
| 5,835,080 A | 11/1998 | Beeteson et al. | |
| 5,880,411 A | 3/1999 | Gillespie et al. | |
| 5,917,906 A * | 6/1999 | Thornton | 379/433.07 |
| 5,943,043 A | 8/1999 | Furuhata et al. | |
| 5,977,867 A | 11/1999 | Blouin | |
| 5,982,304 A | 11/1999 | Selker et al. | |
| 6,188,391 B1 | 2/2001 | Seely et al. | |
| 6,218,966 B1 | 4/2001 | Goodwin et al. | |
| 6,310,614 B1 * | 10/2001 | Maeda et al. | 345/173 |
| 6,323,846 B1 | 11/2001 | Westerman et al. | |
| 6,337,678 B1 | 1/2002 | Fish | |
| 6,356,259 B1 | 3/2002 | Maeda et al. | |
| 6,384,743 B1 * | 5/2002 | Vanderheiden | 341/21 |
| 6,429,846 B2 | 8/2002 | Rosenberg et al. | |
| 6,462,294 B2 | 10/2002 | Davidson et al. | |
| 6,498,353 B2 | 12/2002 | Nagle et al. | |
| 6,501,462 B1 * | 12/2002 | Garner | 345/173 |
| 6,636,202 B2 * | 10/2003 | Ishmael et al. | 345/173 |
| 6,655,788 B1 | 12/2003 | Freeman | |
| 6,657,614 B1 * | 12/2003 | Ito et al. | 345/168 |
| 6,667,738 B2 * | 12/2003 | Murphy | 345/173 |
| 6,700,556 B2 | 3/2004 | Richley et al. | |
| 6,703,924 B2 | 3/2004 | Tecu et al. | |
| 6,743,021 B2 * | 6/2004 | Prince et al. | 434/113 |
| 6,819,316 B2 | 11/2004 | Schulz et al. | |
| 6,861,961 B2 | 3/2005 | Sandbach et al. | |
| 6,877,986 B2 * | 4/2005 | Fournier et al. | 434/112 |
| 6,881,063 B2 * | 4/2005 | Yang | 434/114 |
| 6,930,234 B2 | 8/2005 | Davis | |
| 7,064,655 B2 | 6/2006 | Murray et al. | |
| 7,081,888 B2 * | 7/2006 | Cok et al. | 345/173 |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,131,073 B2 | 10/2006 | Rosenberg et al. | |
| 7,136,045 B2 | 11/2006 | Rosenberg et al. | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |
| 7,191,191 B2 | 3/2007 | Peurach et al. | |
| 7,193,607 B2 | 3/2007 | Moore et al. | |
| 7,196,688 B2 | 3/2007 | Schena | |
| 7,198,137 B2 | 4/2007 | Olien | |
| 7,199,790 B2 | 4/2007 | Rosenberg et al. | |
| 7,202,851 B2 | 4/2007 | Cunningham et al. | |
| 7,205,981 B2 | 4/2007 | Cunningham | |
| 7,208,671 B2 | 4/2007 | Chu | |
| 7,209,028 B2 | 4/2007 | Boronkay et al. | |
| 7,209,117 B2 | 4/2007 | Rosenberg et al. | |
| 7,209,118 B2 | 4/2007 | Shahoian et al. | |
| 7,210,160 B2 | 4/2007 | Anderson, Jr. et al. | |
| 7,215,326 B2 | 5/2007 | Rosenberg | |
| 7,216,671 B2 | 5/2007 | Unger et al. | |
| 7,218,310 B2 | 5/2007 | Tierling et al. | |
| 7,233,313 B2 | 6/2007 | Levin et al. | |
| 7,233,315 B2 | 6/2007 | Gregorio et al. | |
| 7,233,476 B2 | 6/2007 | Goldenberg et al. | |
| 7,236,157 B2 | 6/2007 | Schena et al. | |
| 7,245,202 B2 | 7/2007 | Levin | |
| 7,245,292 B1 * | 7/2007 | Custy | 345/173 |
| 7,249,951 B2 | 7/2007 | Bevirt et al. | |
| 7,250,128 B2 * | 7/2007 | Unger et al. | 264/155 |
| 7,253,803 B2 | 8/2007 | Schena et al. | |
| 7,265,750 B2 | 9/2007 | Rosenberg | |
| 7,280,095 B2 | 10/2007 | Grant | |
| 7,283,120 B2 | 10/2007 | Grant | |
| 7,283,123 B2 | 10/2007 | Braun et al. | |
| 7,289,106 B2 | 10/2007 | Bailey et al. | |
| 7,307,619 B2 | 12/2007 | Cunningham et al. | |
| 7,308,831 B2 | 12/2007 | Cunningham et al. | |
| 7,319,374 B2 | 1/2008 | Shahoian | |
| 7,336,260 B2 | 2/2008 | Martin et al. | |
| 7,336,266 B2 | 2/2008 | Hayward et al. | |
| 7,339,572 B2 | 3/2008 | Schena | |
| 7,342,573 B2 | 3/2008 | Ryynanen | |
| 7,369,115 B2 | 5/2008 | Cruz-Hernandez et al. | |
| 7,382,357 B2 | 6/2008 | Panotopoulos et al. | |
| 7,397,466 B2 * | 7/2008 | Bourdelais et al. | 345/173 |
| 7,432,910 B2 | 10/2008 | Shahoian | |
| 7,432,911 B2 | 10/2008 | Skarine | |
| 7,432,912 B2 * | 10/2008 | Cote et al. | 345/169 |
| 7,433,719 B2 | 10/2008 | Dabov | |
| 7,471,280 B2 * | 12/2008 | Prins | 345/156 |
| 7,522,152 B2 | 4/2009 | Olien et al. | |
| 7,545,289 B2 | 6/2009 | Mackey et al. | |
| 7,548,232 B2 | 6/2009 | Shahoian et al. | |
| 7,567,232 B2 | 7/2009 | Rosenberg | |
| 7,567,243 B2 | 7/2009 | Hayward | |
| 7,589,714 B2 | 9/2009 | Funaki | |
| 7,659,885 B2 * | 2/2010 | Kraus et al. | 345/168 |
| 7,920,131 B2 * | 4/2011 | Westerman | 345/173 |
| 7,989,181 B2 * | 8/2011 | Blattner et al. | 435/69.1 |
| 2001/0043189 A1 * | 11/2001 | Brisebois et al. | 345/156 |
| 2002/0110237 A1 | 8/2002 | Krishnan | |
| 2003/0179190 A1 * | 9/2003 | Franzen | 345/173 |
| 2004/0164968 A1 * | 8/2004 | Miyamoto | 345/173 |
| 2005/0007339 A1 * | 1/2005 | Sato | 345/156 |
| 2005/0007349 A1 | 1/2005 | Vakil et al. | |
| 2005/0020325 A1 | 1/2005 | Enger et al. | |
| 2005/0030292 A1 * | 2/2005 | Diederiks | 345/173 |
| 2005/0057528 A1 * | 3/2005 | Kleen | 345/173 |
| 2005/0088417 A1 * | 4/2005 | Mulligan | 345/173 |
| 2005/0110768 A1 | 5/2005 | Marriott et al. | |
| 2005/0162408 A1 * | 7/2005 | Martchovsky | 345/173 |
| 2005/0231489 A1 | 10/2005 | Ladouceur et al. | |
| 2005/0285846 A1 * | 12/2005 | Funaki | 345/173 |
| 2006/0026521 A1 | 2/2006 | Hotelling et al. | |
| 2006/0097991 A1 | 5/2006 | Hotelling et al. | |
| 2006/0098148 A1 * | 5/2006 | Kobayashi et al. | 349/130 |
| 2006/0118610 A1 | 6/2006 | Pihlaja et al. | |
| 2006/0119586 A1 * | 6/2006 | Grant et al. | 345/173 |
| 2006/0197753 A1 | 9/2006 | Hotelling | |
| 2006/0214923 A1 * | 9/2006 | Chiu et al. | 345/173 |
| 2006/0238510 A1 * | 10/2006 | Panotopoulos et al. | 345/168 |
| 2006/0256075 A1 | 11/2006 | Anastas et al. | |
| 2006/0278444 A1 * | 12/2006 | Binstead | 178/18.06 |
| 2007/0013662 A1 | 1/2007 | Fauth | |
| 2007/0085837 A1 * | 4/2007 | Ricks et al. | 345/173 |
| 2007/0122314 A1 * | 5/2007 | Strand et al. | 422/100 |
| 2007/0152983 A1 | 7/2007 | Mead et al. | |
| 2007/0165004 A1 * | 7/2007 | Seelhammer et al. | 345/173 |
| 2007/0171210 A1 | 7/2007 | Chaudhri et al. | |
| 2007/0182718 A1 * | 8/2007 | Schoener et al. | 345/173 |
| 2007/0236466 A1 | 10/2007 | Hotelling | |
| 2007/0247429 A1 | 10/2007 | Westerman | |
| 2007/0254411 A1 * | 11/2007 | Uhland et al. | 438/127 |
| 2007/0257634 A1 | 11/2007 | Leschin et al. | |
| 2007/0273561 A1 | 11/2007 | Philipp | |
| 2007/0296702 A1 | 12/2007 | Strawn et al. | |

| | | |
|---|---|---|
| 2008/0010593 A1 | 1/2008 | Uusitalo et al. |
| 2008/0136791 A1 | 6/2008 | Nissar |
| 2008/0143693 A1 | 6/2008 | Schena |
| 2008/0150911 A1 | 6/2008 | Harrison |
| 2008/0174570 A1* | 7/2008 | Jobs et al. .................... 345/173 |
| 2008/0202251 A1* | 8/2008 | Serban et al. .................. 73/780 |
| 2008/0238448 A1* | 10/2008 | Moore et al. .................. 324/686 |
| 2008/0252607 A1* | 10/2008 | De Jong et al. ............... 345/173 |
| 2008/0266264 A1* | 10/2008 | Lipponen et al. ............. 345/169 |
| 2008/0286447 A1* | 11/2008 | Alden et al. .................. 427/108 |
| 2008/0291169 A1* | 11/2008 | Brenner et al. ............... 345/168 |
| 2008/0297475 A1* | 12/2008 | Woolf et al. .................. 345/163 |
| 2008/0303796 A1 | 12/2008 | Fyke |
| 2009/0002140 A1* | 1/2009 | Higa .......................... 340/407.1 |
| 2009/0002205 A1* | 1/2009 | Klinghult et al. ............... 341/33 |
| 2009/0002328 A1* | 1/2009 | Ullrich et al. .................. 345/173 |
| 2009/0009480 A1 | 1/2009 | Heringslack |
| 2009/0033617 A1 | 2/2009 | Lindberg et al. |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128503 A1* | 5/2009 | Grant et al. .................... 345/173 |
| 2009/0135145 A1 | 5/2009 | Chen et al. |
| 2009/0140989 A1 | 6/2009 | Ahlgren |
| 2009/0167508 A1 | 7/2009 | Fadell et al. |
| 2009/0167509 A1 | 7/2009 | Fadell et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla et al. |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2010/0103116 A1* | 4/2010 | Leung et al. .................. 345/173 |
| 2010/0103137 A1 | 4/2010 | Ciesla et al. |
| 2010/0162109 A1 | 6/2010 | Chatterjee et al. |

OTHER PUBLICATIONS http://sharp-world.com/corporate/news/070831.html, Sharp Press Release, Aug. 31, 2007, 3 pages "Sharp Develops and Will Mass Produce New System LCD with Embedded Optical Sensors to Provide Input Capabilities Including Touch Screen and Scanner Functions".

U.S. Appl. No. 12/652,704, filed Jan. 5, 2010, Ciesla et.al.

U.S. Appl. No. 12/652,708, filed Jan. 5, 2010, Ciesla et.al.

* cited by examiner

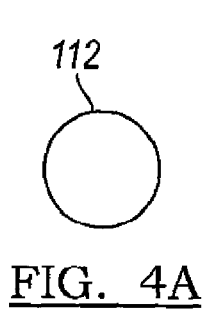
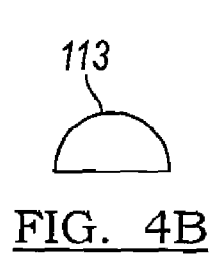
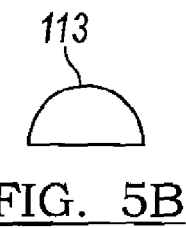
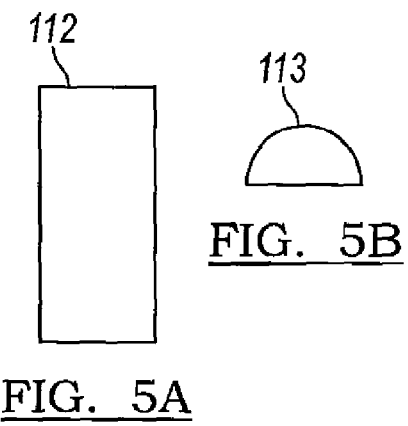
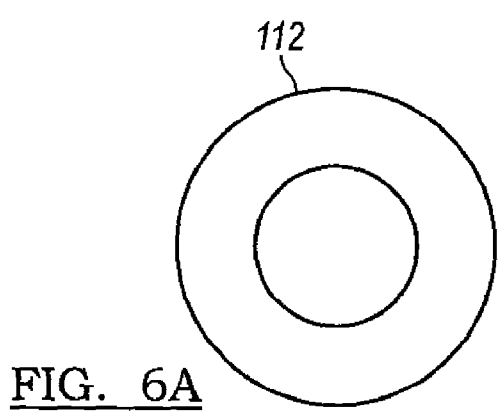
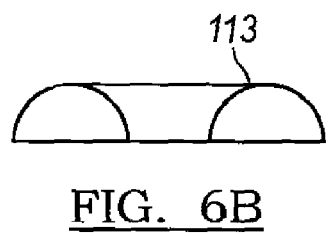
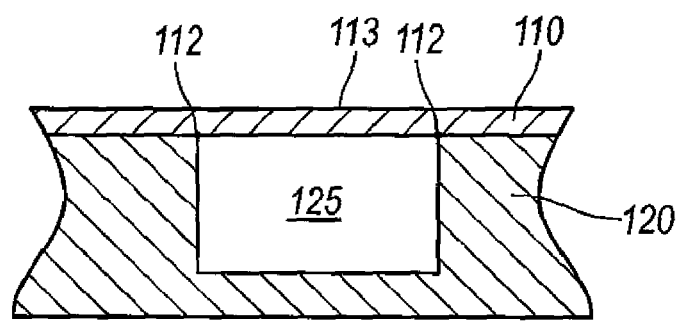
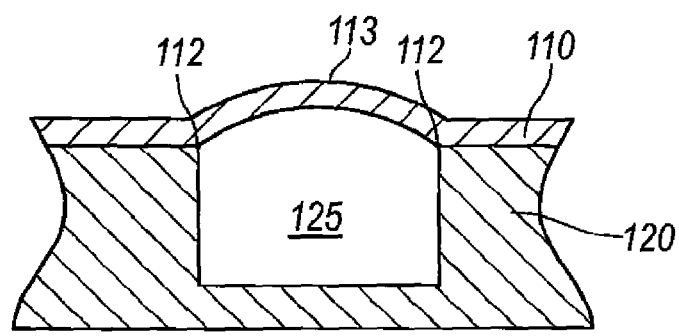

USER INTERFACE SYSTEM

CROSS-REFERENCE TO RELATED APPLICATIONS

This application is a continuation-in-part of U.S. application Ser. No. 12/319,334 filed on 5 Jan. 2009 and entitled "User Interface System" (known internally as TACT-P02), which is incorporated in its entirety by this reference.

This application also claims the benefit of U.S. Provisional Application No. 61/223,002 filed 3 Jul. 2009, which is incorporated in its entirety by this reference.

BRIEF DESCRIPTION OF THE FIGURES

FIGS. 4a and 4b, 5a and 5b, and 6a and 6b are top and cross-sectional views of the circular, rectangular, and ring arrangements, respectively, of the attachment points of the preferred embodiment;

FIGS. 7a and 7b are cross-sectional views of the retracted and extended states, respectively, of the first variation of the first preferred embodiment;

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
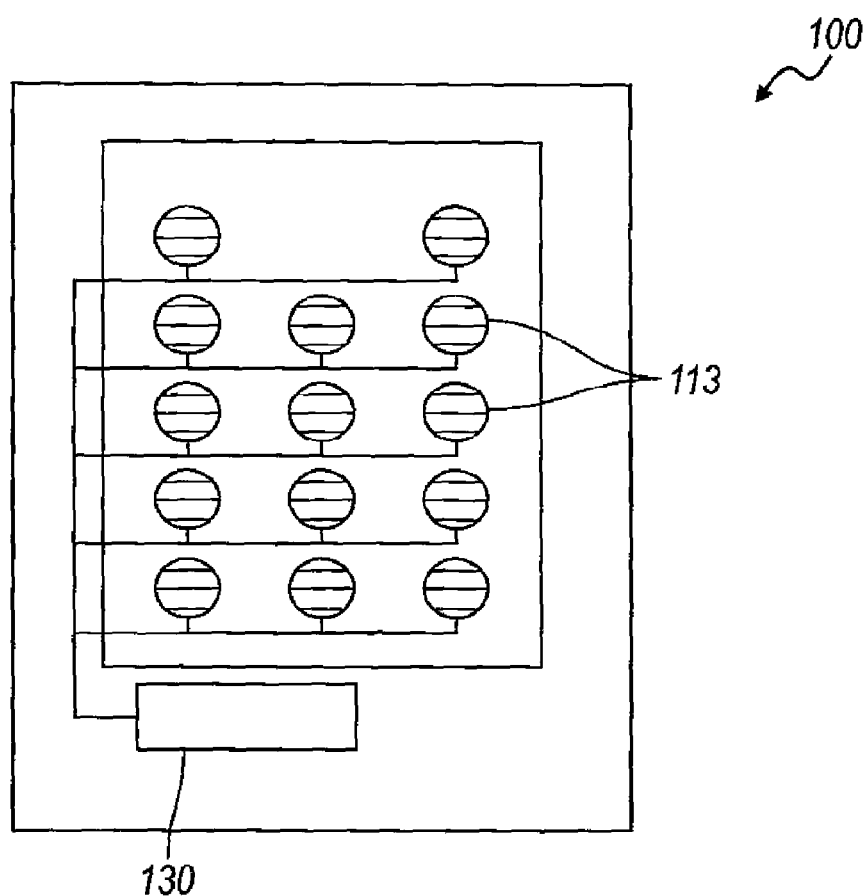
FIG. 1 is a top view of the user interface system of a preferred embodiment.
Figure 2:
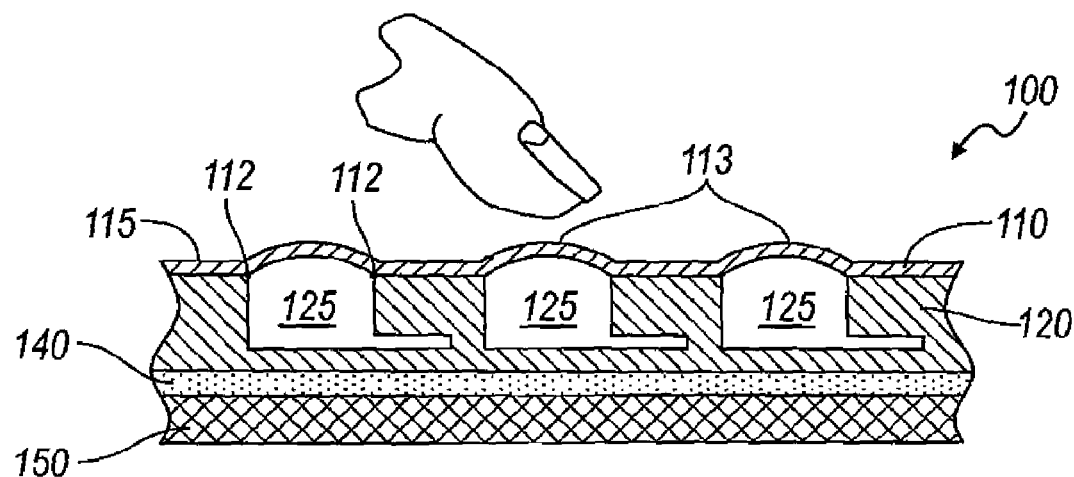
FIG. 2 is a cross-sectional view illustrating the operation of a button array in accordance to the preferred embodiments.

As shown in FIGS. 1 and 2, the user interface system 100 of the preferred embodiment includes: a layer 110 defining a surface 115, a substrate 120 supporting the layer 110 and at least partially defining a cavity 125, a displacement device 130 coupled to the cavity 125 and adapted to expand the cavity 125 thereby deforming a particular region 113 of the surface 115, and a touch sensor 140 that detects inputs from the user. The perimeter of the particular region 113 is at least partially defined by one or more attachment points 112. The user interface system 100 may also include a display 150 coupled to the bottom surface of the substrate 120 and adapted to output images to the user.

The user interface system 100 of the preferred embodiments has been specifically designed to be used as the user interface for an electronic device, more preferably in an electronic device that benefits from an adaptive user interface. The electronic device, which may or may not include a display, is preferably an automotive console, a desktop computer, a laptop computer, a tablet computer, a television, a radio, a desk phone, a mobile phone, a PDA, a personal navigation device, a personal media player, a camera, a watch, a remote, a mouse, a trackpad, or a keyboard. The user interface system too may, however, be used as the user interface for any suitable device that interfaces with a user in a tactile and/or visual manner. As shown in FIG. 3, the surface 115 of the user interface system too preferably remains flat until a tactile guidance is to be provided at the location of the particular region 113. The surface 115 of the user interface system 100 may also be deformed when a user input is required. At that time, the displacement device 130 expands the cavity 125 to expand the particular region 113, forming a deformation that may be felt by a user, and providing tactile guidance for the user. The expanded particular region 113 preferably also provides tactile feedback when the user applies force onto the particular region 113 to provide input. However, any other arrangement of the user interface system too suitable to providing tactile guidance and/or detecting user input may be used.

Figure 3A:
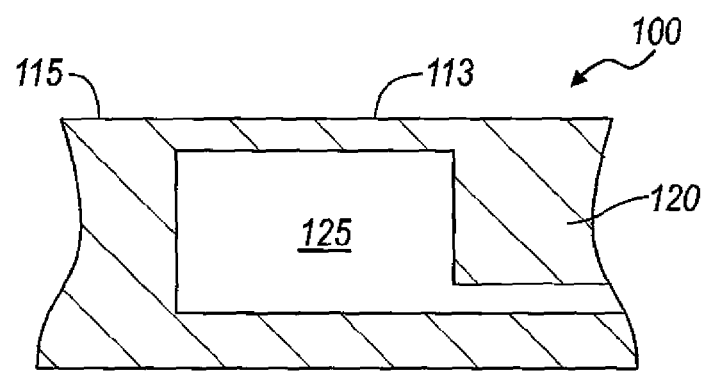
FIGS. 3a, 3b, and 3c are cross-sectional views of the retracted, extended, and user input modes of the preferred embodiments, respectively.
Figure 3B:
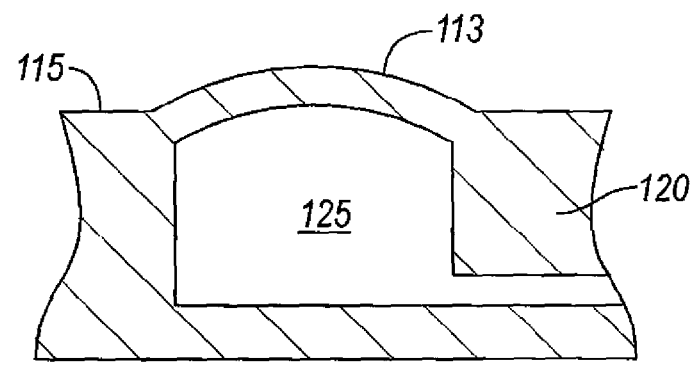
Figure 3C:
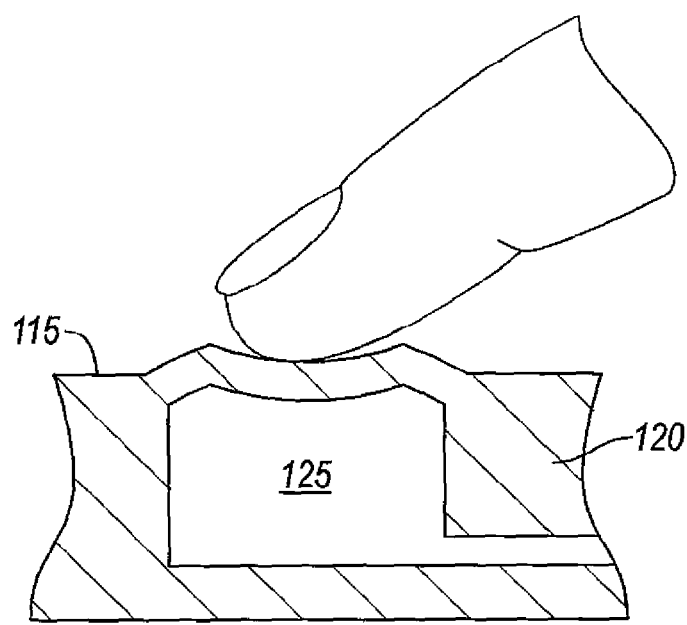

As shown in FIGS. 3a, 3b and 3c, the cavities 125 of the preferred embodiment functions to hold a fluid and to have at least two volumetric settings: a retracted volume setting (shown in FIG. 3a) and an expanded volume setting (shown in FIG. 3b), both of which are actuated by the displacement device 130. When in the expanded volume setting, the user may inwardly deform (or "actuate") the particular region 113 to provide a user input (shown in FIG. 3c). The fluid is preferably a liquid (such as water, glycerin, or ethylene glycol), but may alternatively be a gas (such as air, nitrogen, or argon) or any other substance (such as a gel or aerogel) that expands the cavity 125 and deforms the surface 115. In the expanded volume setting, the cavity 125 expands above the plane of the surface 115, thereby deforming a particular region of the surface 115. The deformation of the particular region 113 functions to provide tactile guidance and/or tactile feedback on the surface 115 for the user. The deformation of the particular region 113 also preferably functions to inform the user of the type of input the deformation represents. For example, the deformation of the particular region 113 may be of a shape that indicates the type of input that the deformation represents. Alternatively, the sheet 110 may include tactile instructions, for example, a pattern of beads or substantially small protrusions that may be felt by the user on the particular region 113 that indicate the type of input the deformation represents. The tactile instructions on the particular region 113 may alternatively be any other type of feature that is able to be felt tactilely by the user.

The layer 110 and the substrate 120 of the preferred embodiment function to cooperatively define the cavity 125. The layer 110 and substrate 120 are preferably similar to the layer and substrate disclosed and taught in U.S. application Ser. No. 12/319,334, but may alternatively be any suitable type. The layer 110 is preferably more pliable than the substrate 120 such that, as the cavity 125 expands, the layer 110 deforms while the substrate no remains relatively undeformed. If the user interface system 100 includes a display 150, then the layer 110 and the substrate 120 are preferably both relatively transparent to allow the images displayed by the display 150 to be seen through the layer 110 and the substrate 120. The layer 110 and the substrate 120 may also be index matched to allow light transmitted through without interruption. However, the layer 110 and the substrate 120 may be of any other suitable property. The layer 110 is preferably directly coupled to the substrate 120. Alternatively, the user interface system 100 may include an additional layer in that is in arranged in between the layer 110 and the substrate 120. The additional layer 111 may function as a support layer that includes perforations that allow for the fluid to expand the cavity 125 and deform the layer 110 and the particular region of the surface 113. In this variation, the attachment point 112 is preferably arranged to couple the layer 110 to the additional layer 111. Alternatively, the additional layer 111 may deform with the layer 110 and the particular region of the surface no. In this variation, the attachment point 112 is preferably arranged to couple the additional layer 111 to the substrate 120. However, any other suitable arrangement of the layer 110, the substrate 120, and the attachment point 112 may be used.

Figure 21A:
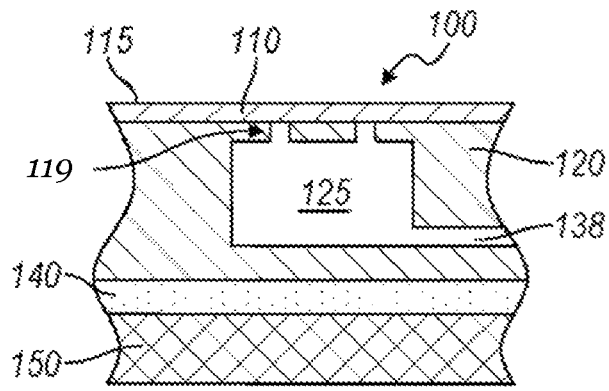
FIGS. 21a and 21b are cross-sectional views of a support member between the layer and the substrate, with the cavity in a retracted volume setting and an expanded volume setting, respectively.
Figure 21C:
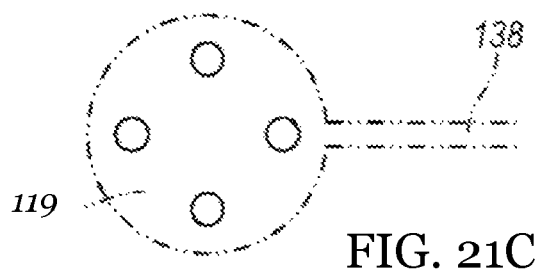
FIG. 21c is a top view of the support member.
Figure 21B:
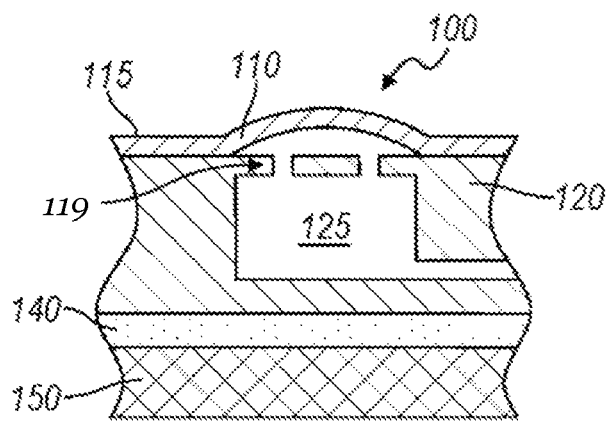
Figure 21D:
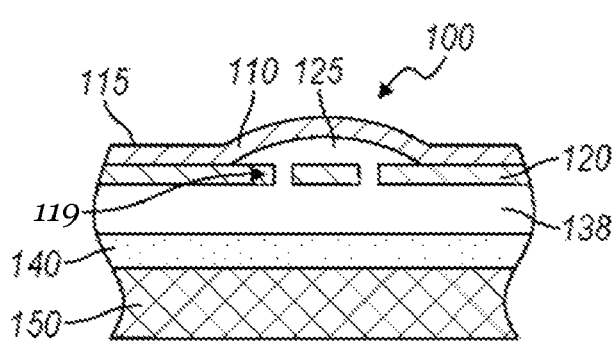
FIG. 21d is a cross-sectional view of an alternative support member that partially defines the cavity.

As shown in FIGS. 21a and 21b, the substrate 120 may include a lattice-like support member 119 under the particular region of the surface 115. When the cavity 125 is expanded and the deformation is present in the surface 115, the support member 119 functions to prevent a user from "pressing too far" into the deformation below the plane of the surface 115. When the cavity 125 is not expanded and the deformation is not present in the surface 115, the support member 119 functions to reduce (or potentially eliminate) the user from feeling "divots" in the surface 115 when swiping a finger across the surface 115. As shown in FIG. 21c, the support member 119 preferably includes holes or channels that allow for the expansion of the cavity 125 and the deformation of the surface 115. The support member 119 is preferably integrally formed with the substrate 124, but may alternatively be formed with the layer no or may be separately formed and later attached to the substrate 120. Finally, as shown in FIG. 21d, the support member 119 may alternatively partially define the cavity 125. The substrate 120 is preferably rigid, but may alternatively be flexible in one or more directions. The substrate 120—if located above the display 150—is preferably optically transparent, but may—if located below the display 150 or if bundled without a display 150—be translucent or opaque. The substrate 120 is preferably made from a material including polymers or glass, for example, elastomers, silicon-based organic polymers such as poly-dimethylsiloxane (PDMS), thermoset plastics such as polymethyl methacrylate (PMMA), and photocurable solvent resistant elastomers such as perfluoropolyethers. The substrate 120 may, however, be made of any suitable material that supports the layer no and at least partially defines the cavity 125. In the preferred version, the substrate 120 is a single homogenous layer approximately 1 mm to 0.1 mm thick and can be manufactured using well-known techniques for micro-fluid arrays to create one or more cavities and/or micro channels. In alternative versions, the substrate 120 may be constructed using multiple layers from the same material or from different suitable materials.

As shown in FIG. 2, the touch sensor 140 of the preferred embodiment functions to detect the presence of a user input proximate to the particular region 113 of the surface 115. The touch sensor 140 preferably detects the presence of a user touch by detecting a force that inwardly deforms the deformed particular region 113 or any other portion of the surface 115, but may alternatively detect the presence of a user touch by detecting the presence of the finger at a location proximate to the particular region 113. The touch sensor 140 may be a capacitive sensor, a resistive sensor, a pressure sensor, or any other suitable type of sensor.

As shown in FIGS. 4-6, the shape of the deformation of the particular region 113 is preferably one that is felt by a user through their finger (or multiple fingers). In a first variation, the shape of the deformation of the particular region 113 preferably acts as and provides the feeling of a button that can be pressed by the user, such as a keyboard (shown in FIGS. 4, 5a, and 5b). In a second variation, the shape preferably acts and provides the feeling of a slider that can be pressed by the user in one location along the slider or that can be swept in a sliding motion along the slider, such as the "click wheel" of the Apple iPod-second generation (shown in FIG. 6). In a third variation, the shape preferably acts and provides the feeling of a pointing stick that can be pressed by the user from multiple directions and/or locations along the surface whereby the user is provided with tactile feedback that distinguishes a first directional touch from a second directional touch and/or a touch in a first location from a touch in a second location, such as the pointing stick marketed by IBM as the TRACKPOINT and by Synaptics as the TOUCHSTYK, which are both informally known as the "nipple". The deformation may, however, act as any other suitable device or method that provides suitable tactile guidance and feedback. In the variation including a display 150, the shape of the deformation of the particular region 113 also preferably functions to minimize the optical distortion of the image underneath the deformed particular region 113.

The shape of the deformation of the particular region 113 is preferably controlled using one of three preferred embodiments. In a first preferred embodiment, the shape is controlled by the location of the attachment points 112 of the layer 110 to the substrate 120. In a second preferred embodiment, the shape is controlled by the geometry of the layer 110 in relation to the attachment points 112. In a third preferred embodiment, the shape is controlled by the material composition of the layer 110 in relation to the attachment points 112. The invention is preferably of one of the three aforementioned embodiments, but may alternatively be any combination or permutation of the three aforementioned embodiments. In other words, the shape of the deformation of the particular region 113 may also be thought of as the result of a formula or combination of characteristics of the particular region 113 of the surface, such as the thickness of the material, the geometry of the material, the modulus of elasticity of the material, and the pressure applied to the particular region 113, and/or the location of the attachment points 112. In addition, any other suitable method for controlling the shape of the deformation of the particular region 113 may be used, for example, the shape of the deformation of the particular region 113 may be changed by adjusting the pressure provided by the displacement device 130 to expand the cavity 125.

1. First Preferred Embodiment: Attachment Point Location

The first preferred embodiment utilizes the location of the attachment points 112 to control the shape of the distortion of the particular region 113. As mentioned above, the perimeter of the particular region 113 is at least partially defined by the attachment points 112. More specifically, the attachment point 112 defines a "transition point" between a first portion of the layer 110 located on a first side of the attachment point 112 that experiences significant deformation (the particular region 113) and a second portion of the layer 110 located on a second side of the attachment point 112 that experiences little or no deformation. In the preferred embodiment, the attachment points 112 are preferably a series of continuous points that define an edge, but may alternatively be a series of non-continuous points. The attachment points 112 are preferably defined during the attachment process of the layer 110 to the substrate 120. For example, the layer 110 may be attached to the substrate 120 using an adhesive, heat treatment, ultra-sonic bonding, oxygen plasma surface treatment, or any other techniques known to one skilled in the art. During the attachment process, a particular region of the layer 110 is left unattached from the substrate 120. The attached region of the layer 110 directly adjacent to this unattached region is defined as the attachment points 112. The attachment points 112 may also be defined during the manufacturing of the layer 110 and the substrate 120. For example, the substrate 120 may be manufactured with attachment geometry (e.g. a hole) and the layer 110 may be manufactured with a reciprocating attachment geometry (e.g. a post). Upon attachment of the layer 110 to the substrate 120, the attachment geometry is engaged, attaching the layer 110 to the substrate 120 and defining the attachment points 112. However, any other method suitable to defining the attachment points 112 may be used.

Figure 8A:
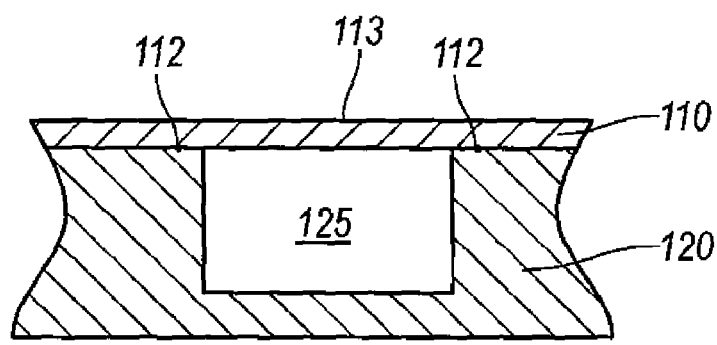
FIGS. 8a and 8b are cross-sectional views of the retracted and extended states, respectively, of the second variation of the first preferred embodiment.
Figure 8B:
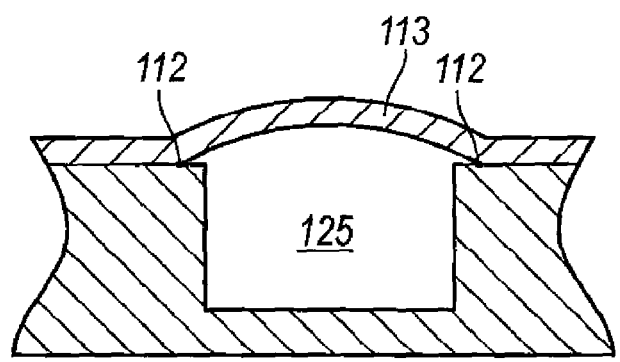
Figure 9A:
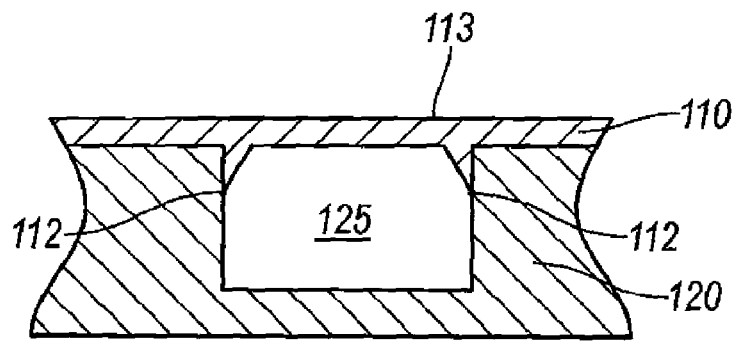
FIGS. 9a and 9b are cross-sectional views of the retracted and extended states, respectively, of the third variation of the first preferred embodiment.
Figure 9B:
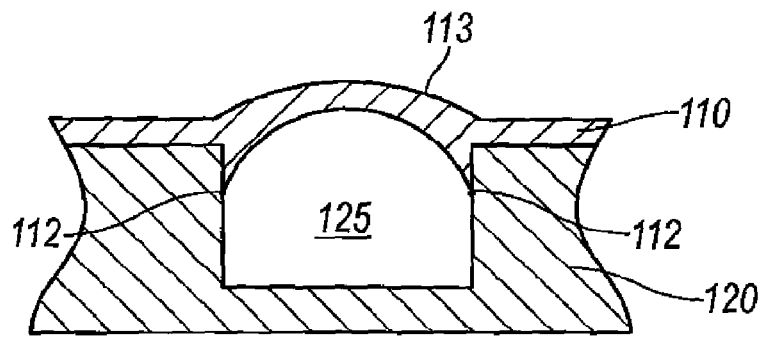

The attachment points 112 preferably define the perimeter of the particular region 113 into a shape selected from (1) a substantially circular region (shown in FIG. 4) that preferably results in a dome-like deformation, (2) a rectangular region (shown in FIG. 5) that preferably results in a ridge-like deformation, (3) a square region (not shown) that preferably results in a square shaped deformation, such as those seen in keyboards, (4) a ring-like region (as shown in FIG. 6) that preferably results in a ridge-like deformation in the form of a ring, and/or any other suitable shape for the particular region 113. As the cavity 125 is deformed by the displacement device 130, the particular region 113 is deformed. The particular region 113 is preferably adjacent to the cavity 125 and/or partially defines the cavity 125, allowing deformation of the cavity 125 to directly deform the particular region 113, but may alternatively be located in any other suitable location. Because the particular region 113 is located adjacent to the cavity 125, the location of the attachment points 112 relative to the cavity 125 have a direct effect on the shape of the deformation of the particular region 113. As shown in FIGS. 7a and 7b, the attachment points 112 at first positions that are closer to the center of the cavity 125 may lead to a dome-like deformation with a first diameter along the surface 115. As shown in FIGS. 8a and 8b, attachment points 112 at second positions that are farther away from the center of the cavity 125 than the first positions, may lead to a dome-like deformation with a second diameter along the surface 115 that is larger than the first diameter. As shown in FIGS. 9a and 9b, attachment points 112 at third positions that are closer to the center of the cavity 125 than the first positions may lead to a dome-like deformation with a third diameter that is smaller than the first diameter. The described attachment points may also lead to dome-like deformations with a first, second, and third height respectively and/or a first, second and third curvature respectively that may be adjusted by varying the level of deformation caused by the displacement device 130. For example, if the level of deformation or level of change in fluid volume caused by the displacement device 130 is constant, because the deformation or fluid of the cavity is spread over a larger surface area in the variation shown in FIGS. 8a and 8b and spread over a smaller surface area in the variation shown in FIGS. 9a and 9b, the tactile feedback felt by the user from the particular region 113 in the variation shown in FIGS. 8a and 8b is of a softer surface than that felt in the variation shown in FIGS. 9a and 9b.

The attachment points 112 may also be located along the wall of the cavity 125 at an "depth" lower than the rest of the layer 110. The attachment points 112 are preferably symmetric relative to the center of the cavity 125, but may alternatively be asymmetric relative to the center of the cavity 125. However, the attachment point 112 may be located in any other location and/or arrangement suitable to achieve the desired shape and feel for the deformation of the particular region 113.

2. Second Preferred Embodiment: Geometry

The second preferred embodiment utilizes geometry of the layer 110 in relation to the attachment points 112 to control the shape of the deformation of the particular region 113. The attachment points 112 of the second preferred embodiment are preferably similar or identical to those of the first preferred embodiment. The geometry of the layer 110 in relation to the attachment points 112 preferably create regions of higher pliability and regions of lower pliability. As the cavity 125 is expanded, the particular region 113 is deformed to accommodate for the adjusted volume and pressure. The regions of higher pliability will deform (e.g. stretch, bend, and/or compress) more while the regions of lower pliability will deform less. The implementation of certain combinations of regions of relatively higher pliability and regions of relatively lower pliability along the layer 113 allows for the control of the shape of the deformation of the particular region 113. Implementation of such regions is preferably achieved in one of several variations.

2.1 Second Preferred Embodiment—First Variation

Figure 10A:
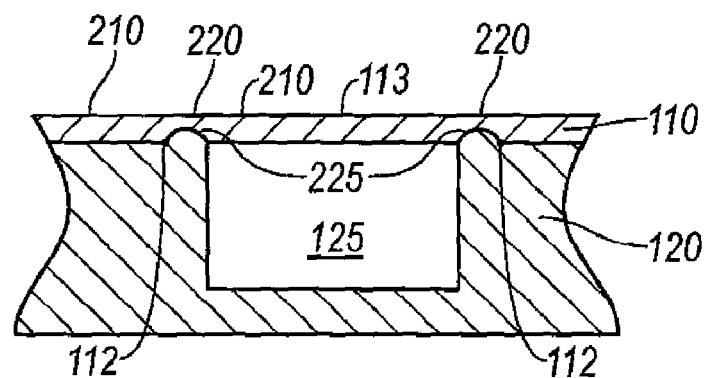
FIGS. 10a and 10b, 11a and 11b, and 12a and 12b are cross-sectional views of the retracted and extended states of the first variation of the second preferred embodiment with thin regions at the attachment point, thin regions closer to the center of the cavity than the attachment point, and with multiple thin regions, respectively.
Figure 10B:
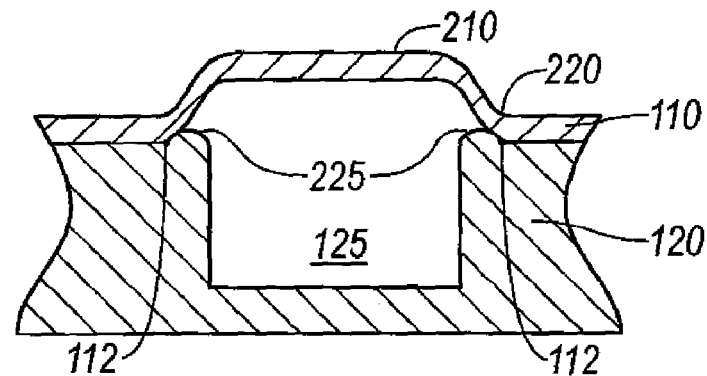
Figure 11A:
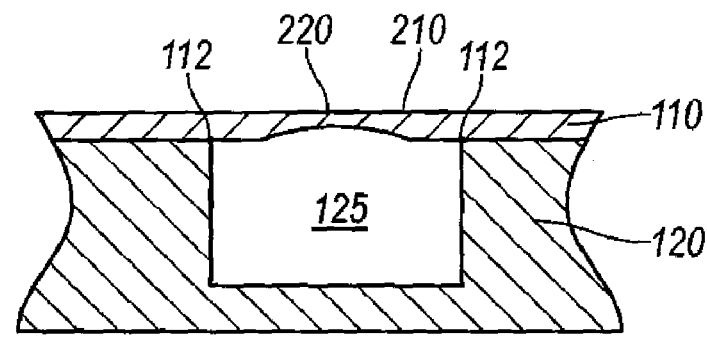
Figure 11B:
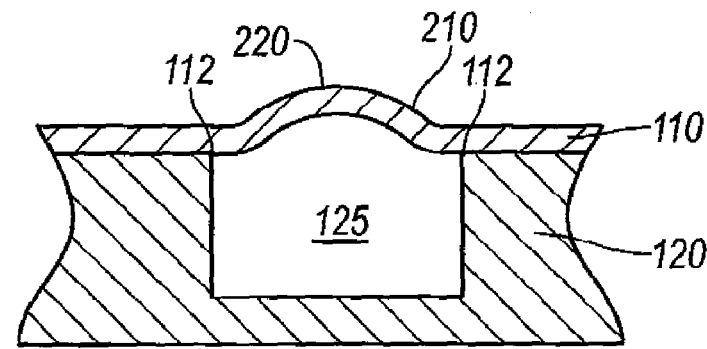

In a first variation of the second preferred embodiment, as shown in FIGS. 10a and 10b, the layer 110 includes a first portion 210 with a first thickness and a second portion 220 with a second thickness that is less than the first thickness. The surface 115 is preferably planar, thus the thickness is preferably "removed" from the side of the layer 110 opposite of the surface 115, but may be "removed" from any other suitable portion of the layer 110 that does not cause the side of the layer 110 that defines the surface 115 to be noticeably non-planar. In this variation, the layer 110 is preferably of a homogenous or uniform material. The layer 110 may also include a third portion (not shown) of a third thickness that is less than the first thickness, but greater than the second thickness. The third portion may alternatively be of a varying thickness and functions as a transitional region between the first portion 210 and the second portion 220. The third portion may alternatively function to provide additional control of the shape of the deformation of the particular region 113. For example, in the variation wherein the deformation of the particular region 113 is a square-like deformation, the third portion may function to form a concave top surface, providing the user with a tactile indication of where to place their finger, similar that seen on a key of a keyboard. The second portion 220 effectively acts as a material with higher pliability than the first portion 210 and substantially biases the particular region 113 to deform at a higher degree at the second portion 220 than at the first portion 210. The second portion 220 of the layer 110 may be located adjacent to the attachment points 112 (shown in FIG. 10a), resulting in a higher degree of deformation at the attachment points 112 (shown in FIG. 10b), but may alternatively be located closer to the center of the cavity 125 than the attachment points 112, as shown in FIG. 11a, resulting in a lesser degree of deformation at the attachment points 112 and a higher degree of deformation at the second portion 220 of the layer 110, as shown in FIG. 11b. However, the second portion 220 of the layer 110 may be located in any other suitable location where a higher degree of deformation is desired. The user may feel the pliability differences between the first portion 210 and the second portion 220. Because the thickness of the second portion 220 is preferably "removed" from the side of the layer 110 opposite of the surface 115, the surface of the substrate 120 that interfaces with the layer 110 may include a mating geometry 225 to support the layer 110 at the second portion 220 and decrease the difference felt by the user between the first and second portions 210 and 220, as shown in FIGS. 10a and 10b. The combination of the first portion 210 and the second portion 220 may also result in a deformation shape that is no longer a typical dome-like shape. For example, as shown in FIGS. 10a and 10b, the resulting shape is preferably a button with a relatively flat top. If the user interface system boo is provided with a display 150, this may be advantageous in preventing the optical distortion of an image that is displayed on a display 150 underneath the particular region 113.

Figure 12A:
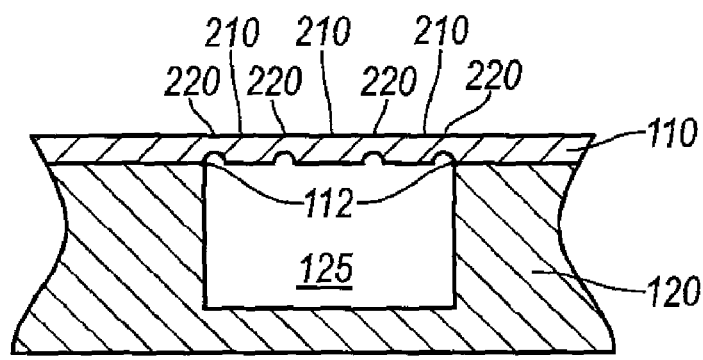
Figure 12B:
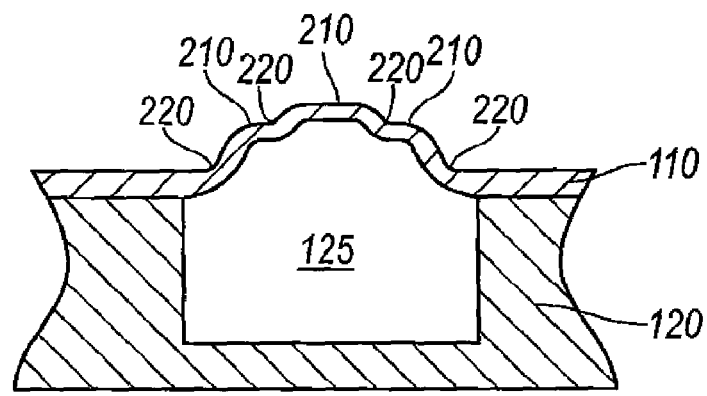

As shown in FIG. 12a, a plurality of first and second portions 210 and 220 may be included in the layer 110, which results in a deformation shape of a nub with bellows, as shown in FIG. 12b. This shape may be useful in the application of a pointing stick by allowing for a higher degree of tactile feedback (e.g. from the elastic response of the plurality of second portion 220s) when the user pushes the deformation in a variety of directions. However, any other suitable arrangement of the thinner second portion 220s may be used.

Figure 13A:
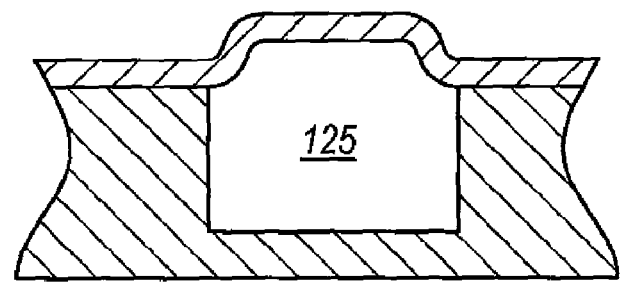
FIGS. 13a and 13b are cross sectional views of the fully expanded and user actuated states, respectively, of the particular region.
Figure 13B:
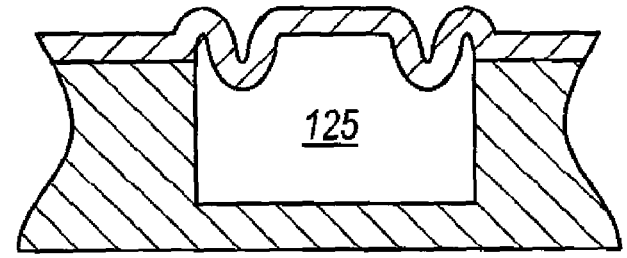

The combination of first and second portion 220S may be used to create a "living" or "natural" hinge, such as those seen in commonly used snap top bottle caps. The natural hinge for the deformation of the particular region 113 preferably allows for two states, an extended state and a retracted state. When the cavity 125 is not deformed, the particular region is preferably in the retracted state. As the cavity 125 is expanded, the particular region 113 is preferably transitioned into an expanded state. When the cavity 125 is returned to the not deformed state, the particular region 113 is also preferably returned to the retracted state. Alternatively, as shown in FIGS. 13a and 13b, the "living" or "natural" hinge may function to provide a third state to the deformation of the particular region 113. For example, the expanded state of the deformation of the particular region 113 may include two states: the fully expanded state (as shown in FIG. 13a) and the user actuated state (as shown in FIG. 13b). The fully expanded state functions to provide the user with tactile guidance and the actuated state functions to provide the user with the tactile indication that the user has applied a force to the system. The user actuated state is preferably of an expansion that is in between the retracted state and the fully expanded state. Once the force applied by the user is removed, the deformed particular region preferably returns to the fully actuated state until the cavity 125 is no longer expanded. In other words, the expanded state of the deformation of the particular region 113 is a bi-modal geometry. This may be applied in user scenarios wherein the user interface system 100 provides tactile guidance for a "clickable" button (e.g. a keyboard key).

The thinner second portion 220 is preferably created during the manufacturing process of the layer 110. For example, the layer 110 may be molded to contain the first portion 210, thinner second portion 220, and/or the third portion. The thinner second portion 220 may also be created after the layer 110 has been made. For example, the layer 110 may be molded as a continuous sheet with uniform thickness. The thinner second portion 220 is then created through a cutting process that removes an amount of thickness from the second portion 220 of the layer 110. However, any other suitable method and/or process to create the second portion 220 may be used.

2.2 Second Preferred Embodiment—Second Variation

Figure 14A:
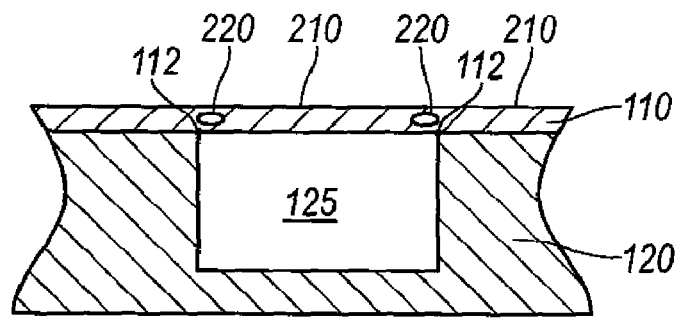
FIGS. 14a and 14b are cross-sectional views of the second variation of the second preferred embodiment with a pocket within the layer in the retracted and extended state.
Figure 14B:
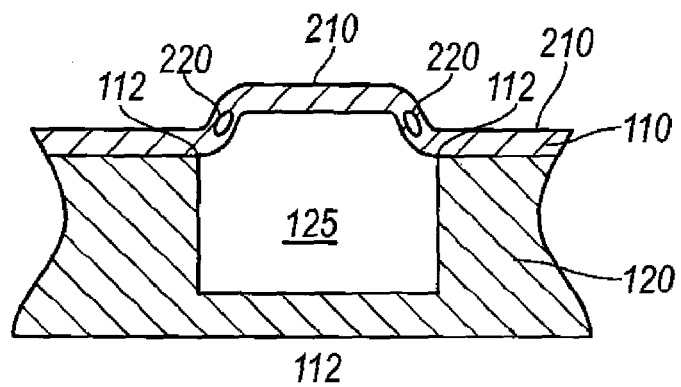

In a second variation of the second preferred embodiment, as shown in FIG. 9, the layer 110 preferably includes a second portion 220 that defines a pocket (or "void") within the layer 110 and a first portion 210 that is continuous and does not define a cavity. In this variation, the layer 110 is preferably made of a uniform material. The layer 110 may also include a third portion that defines a pocket smaller than the pocket of the second region 220. The third portion may alternatively define a pocket of varying size and functions as a transitional region between the first portion 210 and the second portion 220. The third portion may alternatively function to provide additional control of the shape of the deformation of the particular region 113. For example, in the variation wherein the deformation of the particular region 113 is a square-like deformation, the third portion may function to form a concave portion of the square, providing the user with a tactile indication of where to place their finger, similar that seen on a key of a keyboard. The second portion 220 effectively acts as a material with higher pliability than the first portion 210 and substantially biases the particular region 113 to deform at a higher degree at the second portion 220 than at the first portion 210, as shown in FIGS. 14a and 14b. The second portion 220 of the second variation preferably functions similarly or identically to the second portion 220 of a second thickness in the first variation.

The pocket is preferably defined during the manufacturing process of the layer 110, for example, the layer 110 may be manufactured using a plurality of thin-layers that are stacked. Thin-layers that are placed towards the middle of the layer 110 preferably define a hole while thin-layers that are placed on the top and bottom of the layer 110 are preferably continuous (e.g. do not define a hole). When stacked, the completed layer 110 will contain the second portion 220 that defines a pocket. The pocket may alternatively be defined in a post-manufacturing process, for example, a heat treatment in a particular location along the layer 110 that causes the material of the layer 110 to shrink at the particular location, causing a pocket to form internally. The pocket may also be filled with a fluid, gel, or any other suitable material that has a refractive index that is substantially identical to that of the sheet no. This will allow the second portion 220 to be a region of higher pliability while remaining substantially invisible to the user. However, any other method and/or process suitable to creating the pocket may be used. Additionally, similar to the first variation, the layer 110 may include a plurality of first and second portions 210 and 220 to create a desired shape for the deformation of the particular region 113.

Figure 15A:
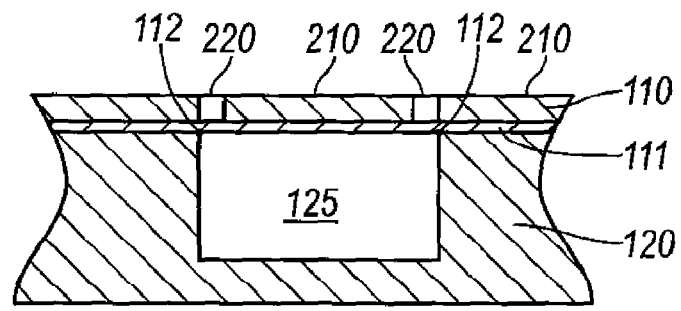
FIGS. 15a and 15b are cross-sectional and top views, respectively, of the second variation of the second preferred embodiment with a pocket through the thickness of the layer.
Figure 15B:
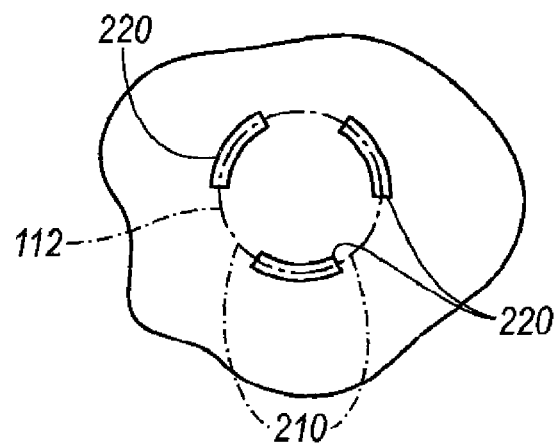

As shown in FIGS. 15a and 15b, the pocket may extend through the entire thickness of the layer 110 (thereby creating a "canyon") and alternated with first portions that do not define a pocket. In this variation, the pocket is preferably isolated from the cavity 125, preferably by the additional layer in, but may alternatively be by any other suitable method. In this variation, the additional layer 111 preferably functions to prevent leakage of the fluid from the cavity 125 through the layer 110 onto the surface 115. The additional layer 111 is preferably continuous without any perforations, preventing the passage of the fluid through the additional layer 111 to the layer 110 where the fluid may leak through the pocket onto the surface 115. Alternatively, the additional layer 111 may function to allow fluid to pass through proximal to the first portion 210 of the layer 110 that does not include pockets and to prevent fluid to pass through proximal to the second portion 220 of the layer 110 (for example, by forming a webbing between the additional layer 111 and the layer 110 that directs flow of fluid as desired), thus preventing fluid from leaking out the pockets to the surface 115. However, the additional layer 111 may prevent leakage of fluid through the layer 110 to the surface 115 in any other suitable method. The pocket of this variation may also be defined using the layering method of thin-layers described above, but may alternatively be defined in a post-manufacturing process, for example, a stamping process. The layer 110 may be manufactured as a continuous sheet using any suitable method and then cut using a cutting die, creating a pocket through the thickness of the layer 110. The cutting die may create a plurality of pockets at one time, but may alternatively create one pocket at a time. However, any other method and/or process suitable to creating the pocket may be used.

The pocket of the second variation is preferably of a circular shape (e.g., spherical or cylindrical), but may alternatively be of an arc shape, a rectangular shape (e.g., a rectangular prism), or any other shape suitable to providing the desired geometry of the deformation of the particular region 113.

2.3 Second Preferred Embodiment—Third Variation

Figure 16A:
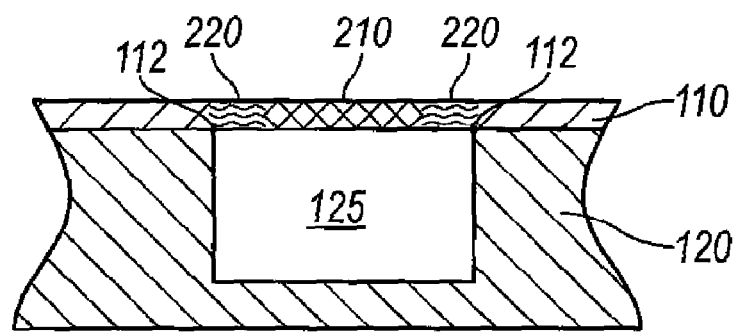
FIGS. 16a and 16b are cross-sectional views of the third variation of the second preferred embodiment in the retracted and extended states, respectively.
Figure 16B:
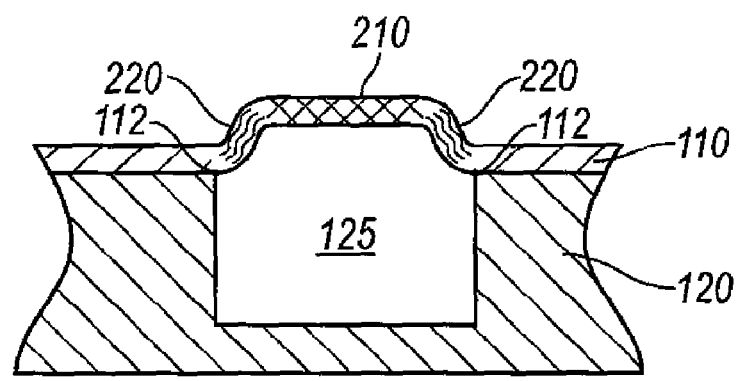

In a third variation of the second preferred embodiment, as shown in FIG. 10, the layer 110 is preferably constructed of a material wherein the molecules, fibers, or an other suitable component of the material may be aligned in a particular direction to influence the overall pliability (i.e., elastic modulus) of the material, for example, the pliability of a polymer material. In this variation, the layer 110 preferably includes a first portion 210 wherein the components of the material are aligned in a first direction and a second portion 220 wherein the components of the material are aligned in a second direction. The effective pliability of the layer 110 seen from the force applied by the deformed cavity 125 is preferably higher in the second portion 220 than the first portion 210. For example, in the variation where the layer 110 is a polymer material, polymers molecules that are aligned in a parallel fashion are less structurally resistant to force applied perpendicular to the molecules than a force applied along the direction of alignment. Additionally, polymer molecules that are arranged in a lattice structure (e.g., a "criss-cross" pattern) are also relatively structurally resistant to applied force. Because of these material properties, in this example, the molecules are aligned perpendicular to the force resulting from the deformation of the cavity 125 in the second portion 220 and parallel to the force resulting from the deformation of the cavity 125 and/or arranged in a lattice pattern in the first portion 210 (as shown in FIG. 16a and 16b). The layer 110 may also include a third portion wherein the molecules are aligned at an angle in between a perpendicular angle and a parallel angle to the force resulting from the deformation of the cavity 125. This third portion preferably functions as a transitional region between the first portion 210 and the second portion 220. The third portion may alternatively function to provide additional control of the shape of the deformation of the particular region 113. For example, in the variation wherein the deformation of the particular region 113 is a square-like deformation, the third portion may function to form a concave portion of the square, providing the user with a tactile indication of where to place their finger, similar that seen on a key of a keyboard. The second portion 220 effectively acts as a material with higher pliability than the first portion 210 and substantially biases the particular region 113 to deform at a higher degree at the second portion 220 than at the first portion 210. The second portion of the third variation preferably functions similarly or identically to the second portion of a second thickness in the first variation. However, any other arrangement of the components of the material of the layer 110 suitable to establishing a first and second portion may be used. Additionally, similar to the first variation, the layer 110 may include a plurality of first and second portions 210 and 220 to create a desired shape for the deformation of the particular region 113.

Implementation of regions of higher pliability and regions of lower pliability is preferably achieved in one of the above variations, but may alternatively be of any combination or permutation of the above variations or any other suitable variations.

3. Third Preferred Embodiment: Material

The third preferred embodiment utilizes the material composition of the layer 110 in relation to the attachment points 112 to control the shape of the deformation of the particular region 113. The attachment points 112 of the third preferred embodiment are preferably similar or identical to those of the first preferred embodiment. The material composition of the layer 110 in relation to the attachment points 112 preferably create regions of higher pliability and regions of lower pliability. As the cavity 125 is expanded, the particular region 113 is deformed to accommodate for the adjusted volume and pressure. The regions of relatively higher pliability will deform (e.g. stretch, bend, and/or compress) more while the regions of relatively lower pliability will deform less. The implementation of certain combinations of these regions along the layer 113 allows for the control of the shape of the deformation of the particular region 113. Implementation of such regions of relatively higher pliability and regions of relatively lower pliability is preferably achieved in one of several variations.

Figure 17A:
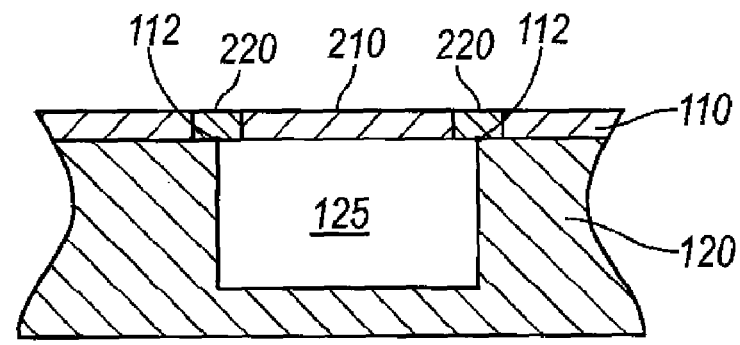
FIGS. 17a and 17b are cross-sectional views of the first variation of the third preferred embodiment in the retracted and extended states, respectively.
Figure 17B:
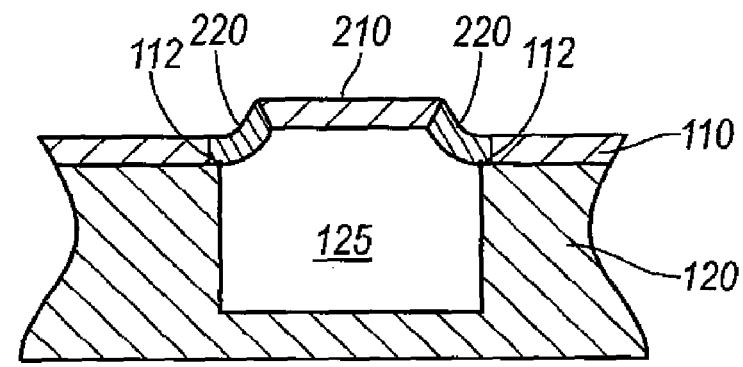
Figure 18A:
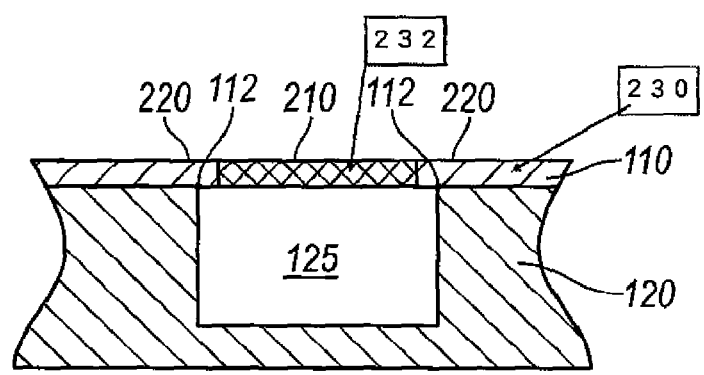
FIGS. 18a and 18b are cross-sectional views of the second variation of the third preferred embodiment in the retracted and extended states, respectively.
Figure 18B:
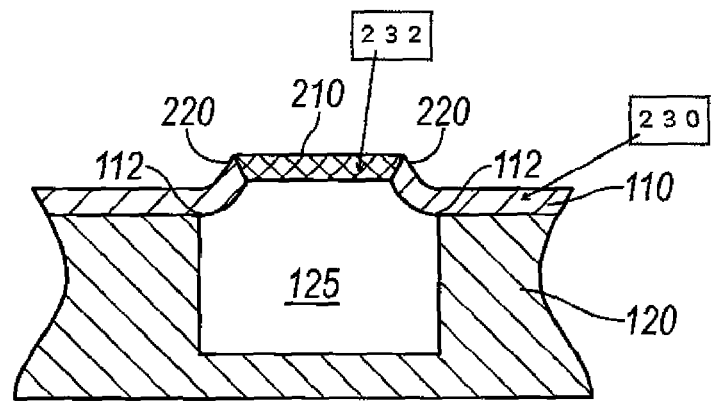

In a first variation of the third preferred embodiment, as shown in FIGS. 17a and 17b, the layer 110 may include a first portion 210 of a first type of material and a second portion 220 of a second type of material. The second type of material preferably has a higher pliability than the first type of material, resulting in higher pliability of the second portion 220 than the first portion 210. The second portion 220 of this first variation of the third preferred embodiment preferably functions similarly or identically to the second portion 220 of the first variation of the second preferred embodiment.

The first and second portions 210 and 220 are preferably assembled during the manufacturing of the layer 110. For example, the layer 110 may be created using a double injection molding process such that the first and second types of material are bonded during the injection molding process. However, any other manufacturing method suitable to combine two types of material may be used. The first and second portions 210 and 220 may alternatively be assembled in a post-manufacturing process. For example, the first portion 210 and the second portion 220 may be manufactured independently and then bonded together using adhesive, heat treatment, ultra-sonic boding, oxygen plasma surface treatment, or any other techniques known to one skilled in the art.

However, any other suitable manufacturing method may be used. Additionally, similar to the first variation of the second preferred embodiment, the layer 110 may include a plurality of first and second portions 210 and 220 to create a desired shape for the deformation of the particular region 113.

In a second variation of the third preferred embodiment, as shown in FIGS. 18a, 18b, 19, and 20, the layer 110 is preferably made of a base material 230 and includes a modifier material 232 that changes the pliability properties of the layer no (for example, lower pliability). The modifier material 232 preferably changes the pliability of the base material 230 by providing a physical structure that mechanically interacts with and affects the pliability of the base material, for example, by providing a scaffold or a support structure across the base material 230 and decreasing pliability in locations of the layer 110 which include the modifier material 232. In a second example, the modifier material 232 may change the pliability of the base material 230 by chemically interacting with the base material, for example, the modifier material 232 chemically reacts with the base material 230 to form a third material of lower pliability than the base material. The chemical reaction preferably occurs during the manufacturing process, but may alternatively occur post-manufacturing, for example, the user may activate the reaction electrically or mechanically. However, the modifier material 232 may modify the pliability of the base material 230 in any other suitable manner. In a first example of the modifier material 232, the modifier material 232 is embedded into a first portion 210 of the layer 110, decreasing the pliability at the first portion 210, and a second portion 220 that includes only the base material. Alternatively, the modifier material 232 may be embedded into the second portion 220 of the layer 110 to increase pliability and the first portion 210 is without the modifier material 232.

Figure 19:
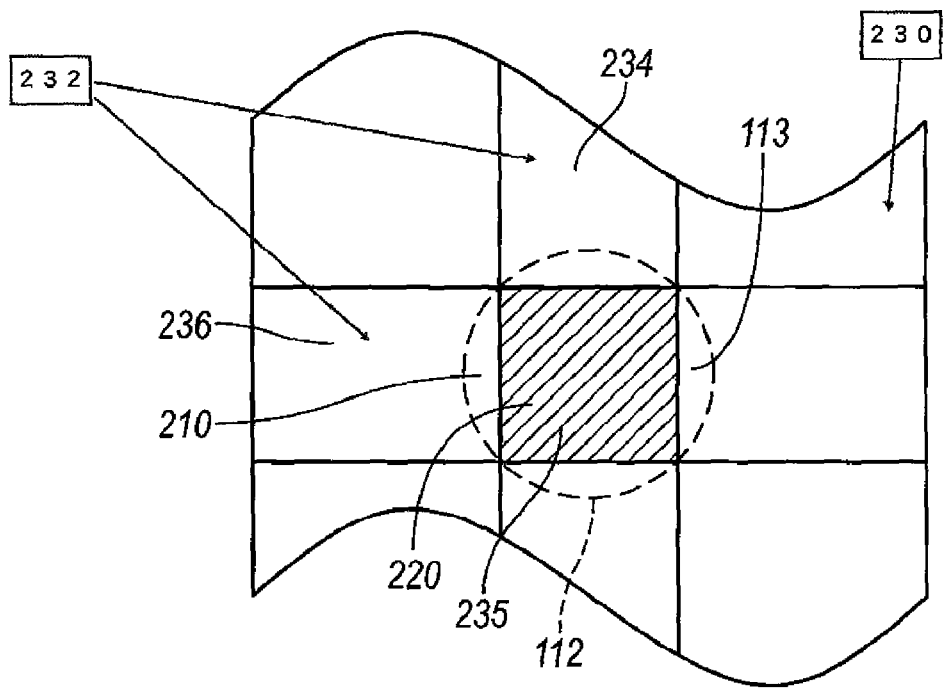
FIGS. 19 and 20 are top views of examples of the second variation of the third preferred embodiment.

In the second example of the modifier material 232, the modifier material 232 may include a secondary material 234 and a tertiary material 236, as shown in FIG. 19, where the combination of the secondary material and the tertiary material changes the pliability properties of the layer 110. The secondary material 234 may be arranged lengthwise along the layer 110 and the tertiary material 236 may be arranged widthwise along the layer 110 and secondary and tertiary materials 234 and 236 overlap at an intersection 235. At the locations where the secondary and tertiary materials 234 and 236 overlap, the secondary material 234 and the tertiary material 236 combine to form an area of different pliability characteristics (for example, higher pliability). In the example as shown in FIG. 19, the intersection 235 is located within the particular region 113 and forms a second portion 220 of increased pliability, but the intersection 235 may alternatively form a first portion 210 of decreased pliability. Alternatively, the second example of the modifier material 232 may be of a material type that changes pliability in a direct relationship with the amount of material present, for example, a material where the thickness of the material determines pliability. Similar to the variation of the modifier that includes a secondary material 234 and a tertiary material 236, a portion of the modifier material 232 may be arranged lengthwise along a the layer 110 and a second portion of the modifier material 232 may be arranged widthwise along the layer 110 wherein the first and second portions of the modifier material 232 overlap at an intersection 235. At the locations where the first and second portions overlap, a region with a substantially higher content of the modifier material 232 forms, changing the pliability characteristics of the region. In these variations of the second example of the modifier material 232, the region wherein the secondary and tertiary materials 234 and 236 are not combined or where the content of the modifier material 232 is lower may also have a different pliability characteristic from the base material. However, any other suitable arrangement of modifier material 232 may be used.

In a third example of the modifier material 232, the modifier material 232 may be the same material as the base material. In this variation, the pliability of the base material 230 may be adjusted when treated with a treatment such as heat treatment or ultraviolet treatment. For example, the polymer chains of a polymer based base material 230 may cross link when exposed to ultraviolet light, thus decreasing the pliability of the cross linked portions of the base material 230. To obtain the effect of a first portion 210 with less pliability and a second portion 220 with higher pliability, during production a mask may be placed over the second portion 220 prior to an ultraviolet treatment. As a result, the regions without the mask will become first portions 210 with lower pliability and the regions with the mask will remain relatively more pliable. After the ultraviolet treatment, the base material 230 may be coated to prevent further cross-linking of the polymer chains when exposed to ultraviolet light. However, any other suitable method may be used to adjust the pliability of particular portions of a base material 230 with adjustable pliability.

Figure 20:
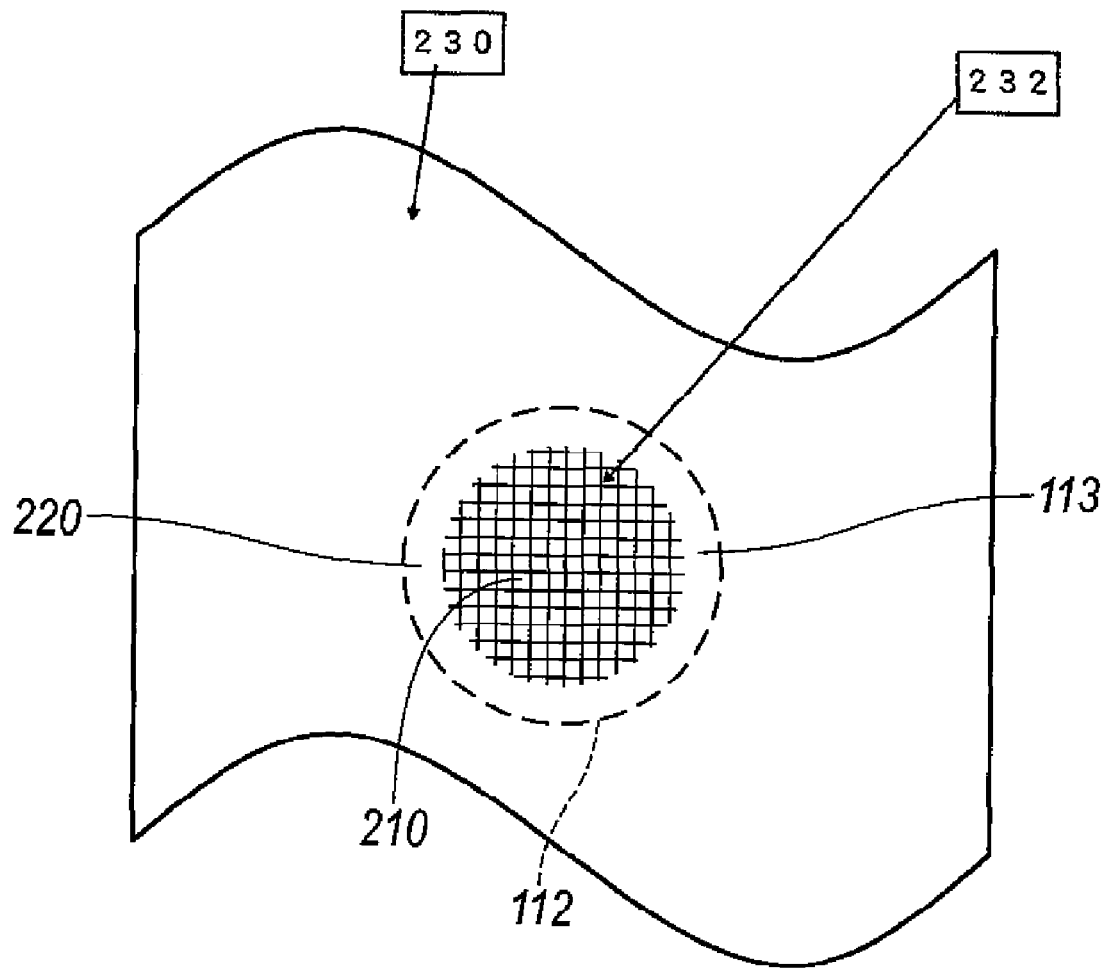

The modifier material 232 may be of a material substantially similar to the base material 230 (e.g., a polymer of a second type embedded into a polymer of a first type) or may alternatively be of a material substantially dissimilar from the base material 230 (e.g., a metallic material embedded into a polymer material). In the variation of the modifier material 232 that includes a secondary material and a tertiary material, the secondary and tertiary materials may be of a material substantially similar or identical to each other and/or the base material. Alternatively, the secondary, tertiary, and base materials may be of substantially different types of materials. The modifier material 232 may be arranged into a variety of patterns and/or geometries, such as a lattice structure (as shown in FIG. 20), a plate structure, a plurality of strips, a ring structure, a plurality of concentric rings, a hexagonal structure, a rectangular structure, or any other suitable structure to control the shape of the deformation of the particular surface 113. A plurality of modifier material 232 may also be embedded at different levels within the thickness of the layer 110. The embedded modifier material 232 preferably functions to decrease the overall pliability of the first portion 210, allowing the first portion 210 to effectively act as a material with lower pliability than the second portion 220, substantially biasing the particular region 113 to deform at a higher degree in the second portion 220 than at the first portion 210. Alternatively, the embedded modifier material 232 may function to increase the overall pliability of the second portion 220.

The modifier material 232 is preferably embedded into the first portion 210 or the second portion 220 during the manufacturing process of the layer 110. Preferably, the modifier material 232 may be placed within a mold for the layer 110 and embedded into the layer 110 at the first portion 210 during the molding process. Alternatively, the layer 110 may be manufactured using a layering process wherein thin-layers are stacked. During the stacking process of the thin-layers, the modifier material 232 may be placed in the first portion 210 and embedded into the layer 110 during the thin-layer stacking process. In a variation of the thin-layer stacking process, the layer 110 may consist of at least two thin-layers wherein the thin-layers are each manufactured independently and then assembled with the modifier material 232 placed in between the thin-layers in a suitable arrangement. The thin-layers may then be attached or bonded using adhesive, heat treatment, ultra-sonic bonding, oxygen plasma surface treatment, or any other techniques known to one skilled in the art. Alternatively, the modifier material 232 may be formed into the suitable arrangement and then inserted in between two layers of base material. The pre-formed modifier material 232 may then be bonded or attached to the base material. The modifier material 232 may alternatively be embedded into the first portion 210 after the layer 110 has been made. For example, the layer 110 may be molded to define a niche in the first portion 210. The modifier material 232 is then assembled into the niche and sealed with a sealing material that is preferably substantially similar to the base material 230 (for example, a plug made of the base material 230 that is bonded to the layer 110) but may alternatively be of a sealing material substantially dissimilar from the base material 230 (for example, an adhesive or a sealant). The layer 110 may also be molded as a continuous layer, wherein a post-manufacturing process creates a niche at the first portion 210 of the layer 110, allowing the modifier material 232 to be assembled into the niche through a process similar to that mentioned above. In the variation where the modifier material 232 chemically reacts with the base material, the assembled modifier material 232 and base material 230 of the layer 110 may be put through a heat treatment, an ultraviolet treatment, or any other suitable treatment to activate the chemical reaction between the modifier material 232 and the base material. However, any other suitable method and/or process suitable to embedding a secondary material into the first portion 210 of the layer 110 may be used.

As a person skilled in the art of will recognize from the previous detailed description and from the figures and claims, modifications and changes can be made to the preferred embodiments of the invention without departing from the scope of this invention defined in the following claims.

We claim:

1. A user interface system comprising:
    a volume of fluid;
    a tactile layer defining a tactile surface, touchable by a user, and a back surface opposite the tactile surface, and including a first region and a second region, wherein the second region is of a pliable material and is operable between:
        a retracted state, wherein the second region is flush with the first region; and
        an expanded state, wherein the second region is proud of the first region;
    a substrate joined, by an attachment point, to a portion of the back surface of the first region, wherein the attachment point retains the first region in a substantially planar form and partially defines the shape of the second region;
    the substrate defining a support surface that is adjacent to the second region, is disconnected from the second region, is in contact with the second region in the retracted state, and prevents deformation of the second region inward past the plane of the first region when a force is applied to the tactile surface by the user;
    the substrate further defining a fluid conduit that communicates a portion of the fluid through a portion of the substrate, to the back surface of the second region;
    a displacement device configured to manipulate a portion of the fluid, through the fluid conduit, to the back surface of the second region to transition the second region from the retracted state to the expanded state; and
    a touch sensor coupled to the substrate and configured to detect a user touch on the tactile surface.

2. The user interface system of claim 1, wherein the tactile layer includes at least two sub-layers.

3. The user interface system of claim 1, wherein the first and second regions are substantially continuous at the tactile surface.

4. The user interface system of claim 1, wherein the displacement device increases fluid pressure within the fluid conduit and the fluid conduit communicates the fluid pressure to the back surface of the second region to outwardly deform the second region.

5. The user interface system of claim 1, wherein the second region, in the expanded state, forms a button and the touch sensor detects a user touch substantially proximal to the button.

6. The user interface system of claim 1, wherein the substrate is joined to the back surface of the first region with a plurality of attachment points.

7. The user interface system of claim 6, wherein the plurality of attachment points define a border between the first region and the second region.

8. The user interface system of claim 7, wherein the arrangement of the plurality of attachment points defines the shape of the second region in the expanded state.

9. The user interface system of claim 6, wherein each of the plurality of attachment points are located substantially proximal to each other and form a continuous seal around the second region to substantially prevent leakage of a portion of the fluid between the substrate and the back surface of the first region.

10. The user interface system of claim 9, wherein the attachment points form a continuous seal around the fluid conduit.

11. The user interface system of claim 1, wherein the second region defines a first portion of a first material characteristic and a second portion of a second material characteristic, and wherein the pliability of the second portion is higher than that of the first portion.

12. The user interface system of claim 11, wherein the first portion of the second region is substantially rigid, and wherein, in the expanded state, the second portion outwardly deforms and the first portion defines a raised and substantially planar surface.

13. The user interface system of claim 1, wherein the second region defines a first portion of a first thickness and a second portion of a second thickness, less than the first thickness, and wherein the first and second portions form a continuous tactile surface at the second region.

14. The user interface system of claim 13, wherein the substrate includes a raised feature adjacent to the back surface of the second region at the second portion to support, in the retracted state, the reduced thickness of the tactile layer at the second portion.

15. The user interface system of claim 1, wherein the second region defines a first portion of a first pliability and a second portion of a second pliability greater than that of the first portion.

16. The user interface system of claim 11, wherein the second region comprises a material that is more pliable when a force is applied in a first direction than when a force is applied in a second direction, and wherein the material is oriented in a first direction at the first portion of the second region and the material is oriented in a second direction at the second portion of the second region.

17. The user interface system of claim 16, wherein the structure of the material is selected from the group consisting of: fibrous structure; polymer chain molecules arranged in a parallel structure; and polymer chain molecules arranged in a lattice structure.

18. The user interface system of claim 1, wherein the second region defines a first portion comprising a first material and a second portion comprising a second material, wherein the second material is more pliable than the first material.

19. The user interface system of claim 18, wherein the second region includes a base material and a modifier material, wherein the modifier material modifies the pliability of the base material.

20. The user interface system of claim 19, wherein the pliability of the base material is modified through a chemical reaction with the modifier material.

21. The user interface system of claim 19, wherein the modifier material modifies the pliability of the base material by mechanically interacting with the base material.

22. The user interface system of claim 21, wherein the modifier material is embedded in the base material.

23. The user interface system of claim 19, wherein the first material includes a combination of the base material and the modifier material, wherein the second material includes the base material, and wherein the modifier material decreases the pliability of the base material.

24. The user interface system of claim 19, wherein the first material includes the base material, wherein the second material includes a combination of the base material and the modifier material, and wherein the modifier material increases the pliability of the base material.

25. The user interface system of claim 15, wherein the first portion of the second region is continuous throughout the thickness of the tactile layer and the second portion of the second region defines a void, within the thickness of the tactile layer, that increases the pliability of the second portion.

26. The user interface system of claim 15, wherein the second portion is located adjacent to the attachment point.

27. The user interface system of claim 15, wherein the pliability of the first portion and the pliability of the second portion partially define the shape of the second region in the expanded state.

28. The user interface system of claim 1, wherein the attachment point is located within the fluid conduit.

* * * * *